March 4, 1924.
C. H. RHUDY
FISH SCREEN
Filed March 21, 1922
1,486,034
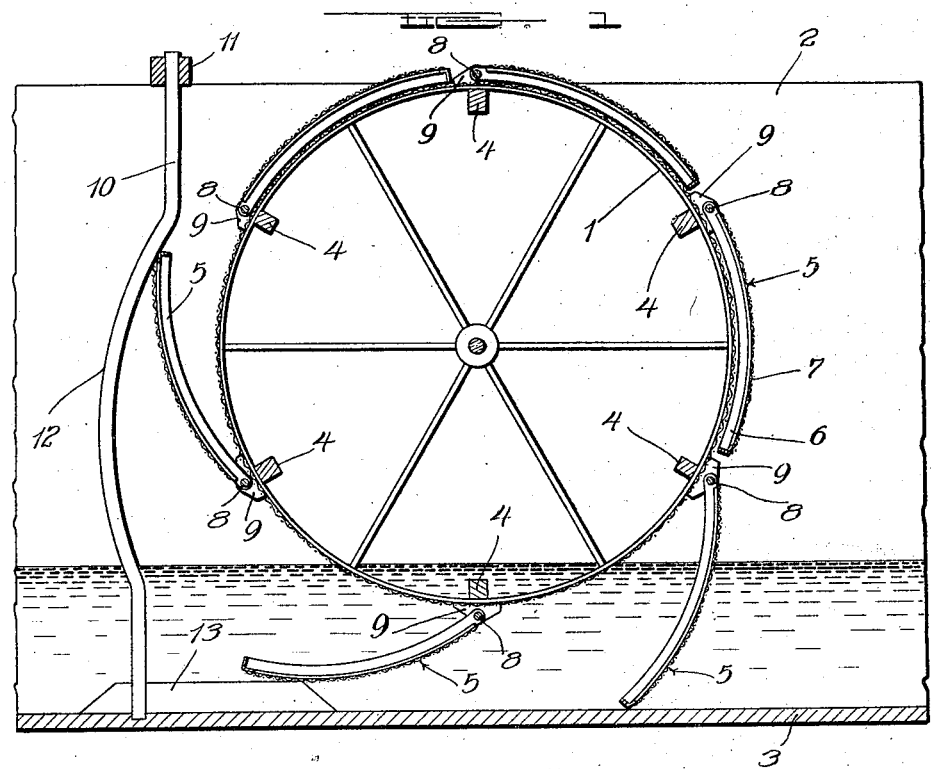
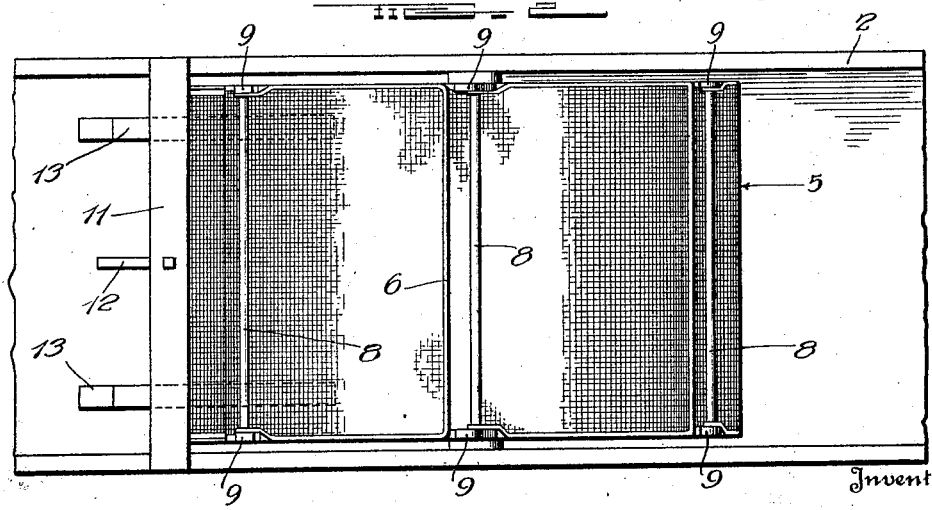
Inventor
C. H. Rhudy
By Townshend & Townshend
Attorney Patented Mar. 4, 1924.

1,486,034

UNITED STATES PATENT OFFICE.

CLARENCE H. RHUDY, OF BISHOP, CALIFORNIA.

FISH SCREEN.

Application filed March 21, 1922. Serial No. 545,449.

*To all whom it may concern:*

Be it known that I, CLARENCE H. RHUDY, a citizen of the United States, residing at Bishop, in the county of Inyo and State of California, have invented certain new and useful Improvements in a Fish Screen, of which the following is a specification.

The invention relates to a fish guard or screen to be used in irrigating ditches, flumes, and the like, to prevent passage of fish while allowing passage of débris.

The primary object is to provide a revoluble screen actuated by the flow of water through the ditch or flume in which the screen is mounted, paddles being carried by the screen to accomplish its revolution.

A further object is the provision in a screen of this character, of swinging guards arranged so that one or more will drag along the bottom of the flume at all times.

Another object is the provision of means for so regulating the travel of the swinging guards that fish caught beneath the guards are given an opportunity to escape upstream.

A still further object is the provision of such a screen which is capable of continued operation should the water level in the flume fall below the bottom of the screen.

With these and such other objects in view as will be apparent from the description, the invention resides in the novel features of the construction, combination, and arrangement of parts hereinafter described and claimed, and illustrated in the accompanying drawings of which;

Figure 1 is a vertical section through a screen constructed in accordance with the invention, and Figure 2, a top plan view of same.

In detail the invention comprises an open screen covered cylinder 1, revolubly mounted between the side walls 2 of a flume, and disposed sufficiently above the bottom 3 of the flume so that such débris as is usually encountered in devices of this type, may readily be passed below the cylinder. Paddle blades 4 are mounted internally of the cylinder at suitable intervals, to provide a means of rotating the cylinder in a manner similar to an undershot wheel.

On the exterior surface of the cylinder are a plurality of swinging guards 5 consisting of arcuate frames 6 covered with screening 7 and hingedly connected to pivot rods 8 connected between ears 9 carried at opposite ends of the cylinder above the paddle blades 4. These guards 5 are so hinged as to swing outwardly from the cylinder and with the flow of the stream, as illustrated in Figure 1. Their arrangement is such that the free ends of the frames are directly adjacent the hinged ends of the succeeding frames, but without overlapping. By this construction, at least two of the guards will be submerged and engaged against the bottom of the flume at all times.

In order to prevent the guards 5 from falling prematurely and becoming jammed, I provide a guide rod 10 supported vertically in the flume at the center, by a transverse bar 11 at the top. This guide rod 10 is disposed upstream of the cylinder and spaced slightly therefrom. Throughout the greater portion of its length the rod is bowed away from the cylinder, as at 12, to allow the guards 5 to be lowered gradually into the water.

Disposed on the bottom of the flume at either side of the guide rod 10 and below the edge of the cylinder, are blocks 13, whose function is to receive the guards 5 when lowered from rod 10, and maintain each guard raised above the flume bottom during an appreciable interval in the revolution of the cylinder.

By this construction an effective means of escape is provided for such fish as may be caught between adjacent guards along the bottom of the flume, as it is well known that a fish when confronted by a moving obstruction, will dart away, the direction of flight in this case being upstream.

I am well aware that much has been done in this art to provide an effective screen that will check the passage of fish while allowing free passage of flotsam and débris. The devices hitherto developed are open to the objections of becoming jammed with débris when the water level falls below the paddle blades. Such a contingency is not possible with a screen constructed in accordance with the present invention, because should the water level fall below the paddle blades 4, increasing pressure of débris against the guards 5 will ultimately rotate the cylinder to clear the screen and lower the succeeding guards.

It will thus be seen that my screen is effective at all times and under all conditions, and is self propelling. While I have illustrated and described certain details entering into the construction and operation of this preferred form of the invention, I desire it to be understood that I do not intend to limit myself to these, but that any such may be used as will fall within the scope of the invention as claimed.

I claim:—

1. The combination with a waterway, of a screened cylinder rotatably carried between the sides thereof and above the bottom, paddle blades on the cylinder for rotation thereof, arcuate screened guards pivoted to the periphery of said cylinder to swing outwardly therefrom on descent and engage the bottom of the waterway, a vertical guide in said waterway and bowed outwardly of the cylinder to engage successive guards for gradual lowering thereof, and abutments on the bottom of the waterway adjacent said guide to engage and retain successive guards in raised position during an appreciable rotation of the cylinder.

2. The combination with a waterway, of a screened cylinder rotatably carried between the sides thereof and above the bottom, a plurality of paddle blades in said cylinder, arcuate screened guards pivoted to the periphery of the cylinder above said paddle blades and arranged to swing outwardly of the cylinder on descent to engage along the bottom of the waterway in such manner that a pair will be engaged at the same time, a vertical rod supported in the waterway in spaced relation from the cylinder and bowed to engage successive guards for gradual lowering thereof and abutments on the bottom of the waterway adjacent said rod to engage and retain one guard of each successive pair in raised position during an appreciable rotation of the cylinder.

3. The combination with a water-way, of a screened cylinder rotatably carried between the sides thereof and above the bottom, a plurality of paddle blades in said cylinder, arcuate screened guards pivoted to the periphery of the cylinder above said paddle blades and arranged to swing outwardly of the cylinder on descent to engage along the bottom of the water-way in such relation that a pair of said guards will be engaged at the same time, a vertical rod mounted in the water-way in spaced relation from the cylinder, and bowed outwardly of said cylinder intermediate its ends to permit a gradual lowering of successive guards, and spaced vertical abutments on the bottom of the water-way adjacent the bottom of said rod and extending slightly beneath the cylinder whereby to engage and retain one guard of each successive pair in raised position during an appreciable rotation of the cylinder.

In testimony whereof I affix my signature

C. H. RHUDY.